(12) United States Patent
Yahata et al.

(10) Patent No.: US 9,777,838 B2
(45) Date of Patent: Oct. 3, 2017

(54) GASKET SEAL, DOOR OF AIRCRAFT, SEAL STRUCTURE FOR OPENING PORTION OF AIRCRAFT, AND AIRCRAFT

(71) Applicant: MITSUBISHI AIRCRAFT CORPORATION, Aichi (JP)

(72) Inventors: Yusaku Yahata, Aichi (JP); Takashi Yokoi, Aichi (JP); Keiichiro Doi, Tokyo (JP); Mikishige Ibaragi, Aichi (JP)

(73) Assignee: MITSUBISHI AIRCRAFT CORPORATION, Aichi (JP)

( * ) Notice: Subject to any disclaimer, the term of this patent is extended or adjusted under 35 U.S.C. 154(b) by 0 days.

(21) Appl. No.: 15/444,587

(22) Filed: Feb. 28, 2017

(65) Prior Publication Data
US 2017/0167611 A1 Jun. 15, 2017

Related U.S. Application Data

(62) Division of application No. 14/345,460, filed as application No. PCT/JP2012/005970 on Sep. 20, 2012, now Pat. No. 9,617,783.

(30) Foreign Application Priority Data

Sep. 20, 2011 (JP) .................................. 2011-205028

(51) Int. Cl.
*F16J 15/00* (2006.01)
*F16J 15/06* (2006.01)
(Continued)

(52) U.S. Cl.
CPC ........... *F16J 15/064* (2013.01); *B64C 1/1407* (2013.01); *F16J 15/027* (2013.01)

(58) Field of Classification Search
CPC .......................... H05K 9/0015; B64C 1/1461
See application file for complete search history.

(56) References Cited

U.S. PATENT DOCUMENTS

| 3,802,125 A | 4/1974 | Baker |
| 4,312,153 A | 1/1982 | Parkinson |
| (Continued) | | |

FOREIGN PATENT DOCUMENTS

| JP | 02-119300 A | 5/1990 |
| JP | 02-191399 A | 7/1990 |
| (Continued) | | |

OTHER PUBLICATIONS

International Search Report for PCT/US2008/078251 dated Feb. 18, 2009.
(Continued)

*Primary Examiner* — Brian M O'Hara
*Assistant Examiner* — Michael Kreiner
(74) *Attorney, Agent, or Firm* — Pearne & Gordon LLP

(57) ABSTRACT

To reliably prevent entrance of electro-magnetic waves in a door that closes an opening portion formed in an airframe of an aircraft. A gasket seal 20 which is arranged between an opening portion 12 formed in an airframe of an aircraft and a door 13 for closing the opening portion 12, includes: a gasket seal body that is made of a rubber material; and conductive fiber 24 that covers a surface of the gasket seal body. When the door 13 is in a closed state, the gasket seal 20 whose surface is made conductive is abutted against a striker 30 provided on a skin 11 side of the airframe and made of a conductive material. The door 13 and the skin 11 of the airframe are electrically connected together via the conductive fiber 24 and the striker 30, and electro-magnetic waves can be reliably shielded.

11 Claims, 8 Drawing Sheets

(51) Int. Cl.
*B64C 1/14* (2006.01)
*F16J 15/02* (2006.01)

(56) References Cited

U.S. PATENT DOCUMENTS

| | | |
|---|---|---|
| 4,854,010 A | 8/1989 | Maraghe et al. |
| 4,857,668 A | 8/1989 | Buonanno |
| 4,980,516 A | 12/1990 | Nakagawa |
| 5,006,666 A | 4/1991 | Laborie |
| 5,008,485 A | 4/1991 | Kitagawa |
| 5,115,104 A | 5/1992 | Bunyan |
| 5,142,101 A | 8/1992 | Matsuzaki et al. |
| 5,202,536 A | 4/1993 | Buonanno |
| 5,386,345 A | 1/1995 | Matsuzaki et al. |
| 5,512,709 A | 4/1996 | Jencks |
| 5,581,048 A | 12/1996 | Shores |
| 5,670,742 A | 9/1997 | Jones |
| 5,902,956 A | 5/1999 | Spies et al. |
| 6,219,906 B1 | 4/2001 | Sosnowski |
| 7,654,488 B2 | 2/2010 | Obst |
| 7,870,701 B2 | 1/2011 | Tammaro et al. |
| 8,633,402 B2 | 1/2014 | Bunyan et al. |
| 2003/0087048 A1 | 5/2003 | Chaussade et al. |
| 2008/0164373 A1 | 7/2008 | Roming |
| 2011/0042517 A1* | 2/2011 | Depeige ............ B64C 1/14 244/129.5 |

FOREIGN PATENT DOCUMENTS

| | | |
|---|---|---|
| JP | 09-83169 A | 3/1997 |
| JP | 2000-124654 A | 4/2000 |
| JP | 2003-523911 A | 8/2003 |
| JP | 2010-541286 A | 12/2010 |
| WO | 2009/045997 A1 | 4/2009 |

OTHER PUBLICATIONS

Author unknown, "EMI Shielding Engineering Handbook." Chomerics (div. of Parker Hannifin Corp) Nov. 2000.

Tong, Xingcun Colin. "Advanced Materials and Design for Electromagnetic Interference Shielding", CRC Press, 2009.

* cited by examiner

DOOR OPENING DIRECTION

Reinforcement

GASKET SEAL, DOOR OF AIRCRAFT, SEAL STRUCTURE FOR OPENING PORTION OF AIRCRAFT, AND AIRCRAFT

This application is a Divisional of U.S. patent application Ser. No. 14/345,460 filed on Mar. 18, 2014, which is a 371 National Phase application of PCT/JP2012/005970, filed Sep. 20, 2012, which claims priority to JP2011-205028, filed Sep. 20, 20111, all are incorporated herein by reference in their entirety.

TECHNICAL FIELD

The present invention relates to a gasket seal, a door of an aircraft, and a seal structure for an opening portion of an aircraft. The present invention also relates to an aircraft having the seal structure.

BACKGROUND ART

Aircrafts must be able to fly safely with no malfunction or unexpected behavior caused during a cruising flight or during landing and takeoff under high intensity radiated fields (HIRF) as an electro-magnetic environment from radios, televisions, radars, transmitters, and other sources. Therefore, HIRF protection measures required in (14CFR) §§23.1308, 25.1317, 27.1317, and 29.1317, High-intensity Radiated Fields (HIRF) protection, which stipulate Regulations (airworthiness requirements) of FAA (Federal Aviation Administration) need to be taken.

FIG. 7 is a view for explaining an HIRF environment when an aircraft approaches an air control radar antenna of an airport during landing or takeoff. In this case, intensive radiated fields are determined based on a slant range to the antenna and a look angle from the antenna.

Recently, the importance of protection of electric/electronic systems of aircrafts has been significantly increasing because of the following reasons:
1) a greater dependence on electric/electronic systems that execute required functions for continued safe flight and landing of aircrafts;
2) a decrease in electro-magnetic shielding by a certain type of composite material used in design of aircrafts;
3) an increase in susceptibility (sensitivity) of electric/electronic systems to HIRF along with increases in operating speed of data buses or processors, density of ICs or cards, and sensitivity of electronics;
4) an expansion of a usage frequency particularly to a high-frequency band of 1 GHz or more;
5) an increase in severity of an HIRF environment along with an increase in the number of RF transmitters and electric power; and
6) an adverse effect on part of aircrafts when exposed to HIRF.

Meanwhile, inside aircrafts, there may be an adverse effect on, for example, communications with an airport control tower, and communications or control of navigation for a flight along a predetermined route due to radio waves or electro-magnetic noise (simply referred to as electro-magnetic noise below) from various electronics such as mobiles, game machines, and notebook computers, or PEDs (Personal Electro Devices) such as active-type RFID (Radio Frequency IDentification) tags attached to air cargos. Thus, as is well known, passengers are asked to refrain from using various electronics inside aircrafts.

Airframes of aircrafts are generally formed of a metal material, and electro-magnetic noise is thus attenuated. Thus, the electro-magnetic noise enters and exits mainly through windows of a cabin and a cockpit. To prevent the electro-magnetic noise that possibly causes a failure from entering the cockpit or an avionics bay from windows, a film of ITO (Indium Tin Oxide), gold, silver or the like is provided so as to be inserted into a window obtained by laminating a plurality of window panels made of acrylic or the like (e.g., see Patent Literature 1).

Meanwhile, as shown in FIG. 8, various opening portions are formed in an airframe of an aircraft in order to allow boarding, inspection, or the like. Doors for closing the opening portions are generally formed of a metal material of the same type as the airframe.

A gasket seal made of an insulating rubber material is provided on one of the door and the opening portion on the airframe side so as to maintain airtightness and prevent intrusion of water (e.g., see Patent Literatures 2 to 5). Anticorrosion treatment is applied to the other side which the gasket seal contacts by anodizing and coating.

CITATION LIST

Patent Literature

Patent Literature 1:
  National Publication of International Patent Application, Publication No. JP2003-523911
Patent Literature 2:
  U.S. Pat. No. 3,802,125
Patent Literature 3:
  U.S. Pat. No. 4,312,153
Patent Literature 4:
  U.S. Pat. No. 4,854,010
Patent Literature 5:
  U.S. Patent Application Publication No. 2008/0164373

SUMMARY OF INVENTION

Technical Problem

Since the door and the airframe of the aircraft are made of a conductive material such as metal, electro-magnetic waves can be prevented from entering from outside. On the other hand, the gasket seal made of a rubber material is arranged in a gap between the opening portion formed in the airframe of the aircraft and the door. The gasket seal is normally fabricated from EPDM rubber (ethylene-propylene-diene rubber) or silicone rubber for the purpose of achieving airtight sealing properties so as to maintain an atmospheric pressure within the airframe against a low pressure outside the airframe, and so as to prevent rain or moisture from entering from outside.

However, since the gasket seal is made of a non-conductive material, the gasket seal does not have an electro-magnetic shielding effect. Thus, electro-magnetic waves pass through the gasket seal directly without being attenuated in a high frequency band with a half wavelength (½ wavelength) or less by allowing the gasket seal to act like an opening slot (an entrance for radio waves). Therefore, the electro-magnetic waves enter the airframe from the gasket seal to possibly affect electronics mounted inside the airframe.

The present invention has been accomplished in view of the technical problem as described above, and an object thereof is to provide a seal structure or the like for an opening portion of an aircraft which can reliably prevent entrance of electro-magnetic waves.

Solution to Problem

To achieve the above object, the present invention provides a novel gasket seal having conductivity. That is, the present invention provides a gasket seal which is arranged between an opening portion formed in an airframe of an aircraft and a closing body for closing the opening portion, the gasket seal including: a gasket seal body that is made of a rubber material; and conductive fiber that covers a surface of the gasket seal body. Here, examples of the closing body for closing the opening portion include a door and an escape hatch. The surface of the gasket seal is made conductive by using the conductive fiber, so that entrance of electro-magnetic waves from the gasket seal can be prevented without deteriorating airtight sealing performance of the gasket seal.

As the conductive fiber, one of a) synthetic fiber where a metal plating film is formed on a surface, b) metal fiber, and c) polymer fiber including a conductive material may be used.

The present invention also provides a seal structure for an opening portion of an aircraft using the above gasket seal. The seal structure includes: the closing body that closes the opening portion formed in the airframe of the aircraft; the gasket seal provided on one of the opening portion and the closing body; and a metallic fitting that is provided on the other of the opening portion and the closing body, and electrically connected to the gasket seal. The opening portion of the aircraft and the closing body that closes the opening portion are electrically connected together via the gasket seal whose surface is made conductive, and the metallic fitting. Accordingly, a return path for lightning current and a bonding path (grounding path) for static electricity can be configured in an airframe structure while preventing the entrance of electro-magnetic waves from the gasket seal. Examples of the metallic fitting include a striker, a scuff plate, and a bonding strap.

A base material of the striker and the scuff plate is a conductive material, and when the closing body is closed, the striker or the scuff plate is abutted against the gasket seal. The striker or the scuff plate preferably includes a plating layer at least on a contact surface with the conductive fiber of the gasket seal. By appropriately selecting a metal material constituting the conductive fiber and a metal material constituting the above plating layer, galvanic corrosion due to joining of dissimilar metals defined in MIL-STD-889 can be prevented even under moisture and salt spray environments. To be more specific, it is preferable that the metal material constituting the plating layer and the metal material constituting the conductive fiber have the same or almost the same anodic index in view of preventing the above galvanic corrosion. When the anodic indexes of the two metal materials are not equal to each other but a difference between the anodic indexes is an absolute value of 0.15 V or less, "the anodic indexes are almost equal to each other" in the present specification.

To prevent corrosion of aluminum alloy constituting the airframe due to galvanic corrosion, aluminum alloy may be changed to corrosion resistant steel (CRSS). However, it is more disadvantageous to use a large amount of corrosion resistant steel in the aircraft since the weight of the aircraft is increased.

On the other hand, in accordance with the method of the present invention in which the material of the conductive fiber of the gasket seal and the material of the plating layer of the striker or the scuff plate are appropriately selected, galvanic corrosion can be easily and inexpensively prevented from occurring while reducing the weight, that is, without an increase in the weight of the airframe.

The present invention may also provide an aircraft having the above seal structure.

Advantageous Effects of Invention

In accordance with the present invention, the entrance of electro-magnetic waves from the gasket seal can be prevented without deteriorating the airtight sealing performance of the gasket seal.

Also, in accordance with the present invention, the door and the airframe side can be electrically connected together via the gasket seal whose surface is made conductive, and the metallic fitting such as the striker. Because of the electro-magnetic shielding structure, a gap between the closing body (the door, the hatch or the like) and a door frame on the opening portion side of the airframe can be electrically closed, and radio waves or electro-magnetic noise can be prevented from entering from an electro-magnetic gap.

DESCRIPTION OF EMBODIMENTS

First Embodiment

In the following, the present invention is described in detail based on embodiments shown in the accompanying drawings.

Figure 1:
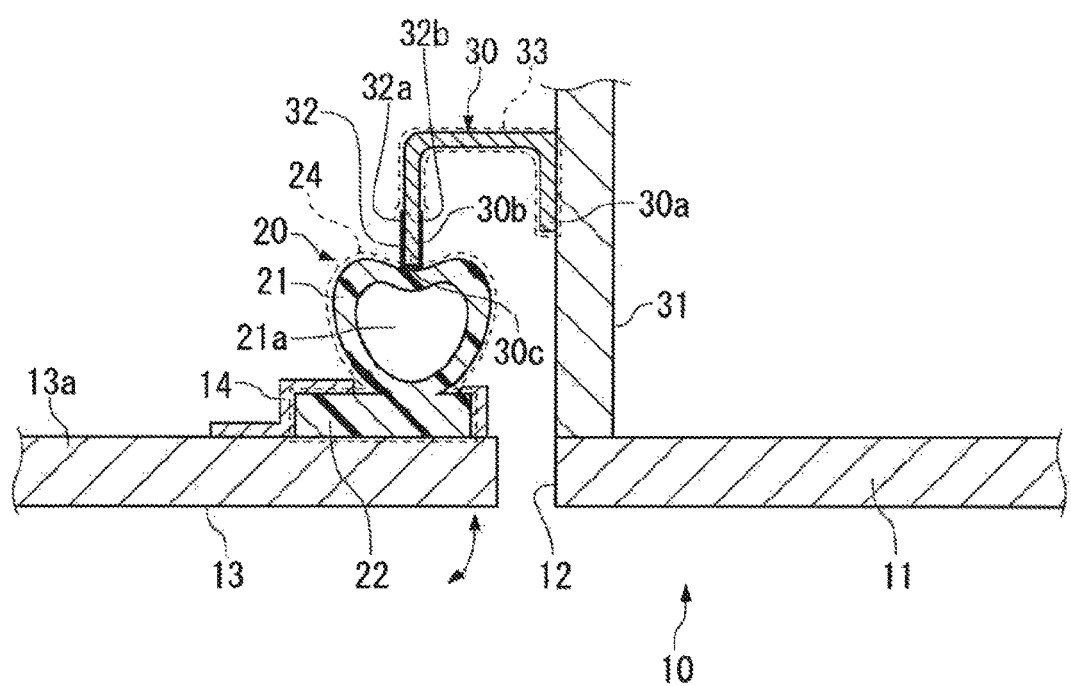
FIG. 1 is a sectional view illustrating one example of a seal structure for an opening portion of an aircraft according to a first embodiment.

As shown in FIG. 1, an opening portion 12 is formed in a skin 11 of an airframe of an aircraft 10 in order to allow boarding, inspection or the like, and a door 13 is openably provided in the opening portion 12.

Here, the skin 11 and the door 13 are formed of a conductive material such as aluminum alloy.

A gasket seal 20 is fixed to one of the door 13 and the opening portion 12, and a striker 30 whose distal end is abutted against the gasket seal 20 is provided on the other of the door 13 and the opening portion 12.

Although the gasket seal 20 is provided on the door 13, and the striker 30 is provided on the opening portion 12 side in the present embodiment, the present invention is of course not limited thereto. That is, the gasket seal 20 may be provided on the opening portion 12 side, and the striker 30 may be provided on the door 13.

The gasket seal 20 is made of a rubber material having elasticity, and can be fabricated by, for example, molding. Examples of the rubber material include silicone rubber, and EPDM rubber (ethylene-propylene-diene rubber). The rubber material in the present application widely includes elastomer and rubber.

The gasket seal 20 comprises a seal portion 21, and a base portion 22 that is formed integrally with the seal portion 21 at one end thereof. The seal portion 21 is provided in an annular shape continuously along an outer peripheral portion of the door 13, and has a hollow portion 21a therein in sectional view. The base portion 22 has a rectangular section, and is provided continuously along the outer peripheral portion of the door 13.

The hollow portion 21a may be formed as an air layer that maintains one atmosphere.

The gasket seal 20 does not always need to have the hollow portion 21a composed of the air layer. For example, silicone sponge or the like may be arranged in the hollow portion 21a to provide a gasket seal with no air layer therein.

Although the gasket seal 20 having a P-shaped sectional shape as a whole is shown in FIG. 1, this is merely one example. The sectional shape of the gasket seal 20 is not limited to the P shape, and may be a D shape, or deformed shapes thereof.

The gasket seal 20 is retained on the door 13 with the base portion 22 fitted to a seal retention portion 14. The seal retention portion 14 is formed on a back surface 13a of the door 13 that is directed to the inner side of the aircraft. The seal retention portion 14 is formed of a conductive material such as aluminum alloy similarly to the door 13.

An edge member 31 that projects to the inner side of the aircraft is formed along a peripheral edge portion of the opening portion 12 on the skin 11 side of the airframe. The striker 30 is attached to the edge member 31. That is, the edge member 31 functions as a door frame. One end portion 30a of the striker 30 is joined to the edge member 31 by a joint member such as a rivet having conductivity. The other end portion 30b of the striker 30 is provided so as to be located inward of the opening portion 12, facing the seal portion 21 of the gasket seal 20 attached to the door 13.

When the door 13 is closed, a distal end portion 30c of the striker 30 is abutted against the seal portion 21 of the gasket seal 20 to compress and deform the seal portion 21 in a crushing direction. Sealing properties of the opening portion 12 formed in the airframe are thereby ensured.

The striker 30 is normally made of a conductive material such as aluminum alloy as a base material.

<First Feature>

A first feature of the present invention is that a surface of the gasket seal 20 is covered with conductive fiber 24. When the gasket seal 20 made of a rubber material is covered with the conductive fiber 24, the surface of the gasket seal 20 can be made conductive. Accordingly, electro-magnetic waves can be prevented from entering the airframe from the gasket seal 20 between the door 13 and the airframe.

Here, the gasket seal may be also made conductive by mixing a conductive filler such as metal into a rubber material without using the conductive fiber 24. However, in this method, when the conductive filler in an amount sufficient enough to prevent the entrance of electro-magnetic waves is mixed into the rubber material, flexibility, stretch, resilience, hardness or the like of the gasket seal are affected, so that airtight sealing performance of the gasket seal is deteriorated. Meanwhile, in accordance with the method of the present invention in which the surface of the gasket seal 20 is made conductive by covering the surface of the gasket seal 20 with the conductive fiber 24, the entrance of electro-magnetic waves from the gasket seal 20 can be prevented without deteriorating the airtight sealing performance of the gasket seal 20.

A gap between the door 13 and the opening portion 12 of the airframe may be also electro-magnetically shielded by a metallic gasket having spring characteristics. Examples of the metallic gasket include a commercially-available Finger Stock fabricated from metal such as beryllium copper and corrosion resistant steel (CRSS). However, since the metallic gasket has a gap and does not have airtight sealing performance, the gasket seal 20 made of a rubber material is used in the present invention as described above.

As one example of the conductive fiber 24, synthetic fiber where a metal plating film is formed on a surface is cited. When the door 13 is made of aluminum alloy, an electro-magnetic shielding effect can be obtained by using a good conductor such as Ag, Cu, Ni, Tin, Cr, and Au as a material of the above metal plating.

As another example of the conductive fiber, (i) metal fiber, and (ii) polymer fiber including a conductive material such as metal, or a compound thereof, or carbon black having conductivity are cited.

The electro-magnetic shielding effect can be also obtained by using, for example, metal fiber made of the above good conductor, or polymer fiber including a filler of the above good conductor or carbon black.

In the aforementioned configuration, the gasket seal 20 covered with the conductive fiber 24 is provided along the outer periphery of the door 13, and electrically grounded to the opening portion 12 of the airframe via the striker 30. Accordingly, a shielding structure made of a conductive material can be formed in the gap portion between the door 13 and the opening portion 12 of the airframe with no electric gap therebetween, so that the entrance of electro-magnetic noise into the airframe can be prevented.

As described above, the conductive gasket seal 20 for preventing the entrance of electro-magnetic noise can be reliably, easily, and inexpensively electrically grounded to the opening portion 12 of the airframe.

Also, when the door 13 is struck by lightning, a return path for lightning current can be configured in the airframe structure by the seal retention portion 14 on the door 13 side, the conductive fiber 24, and the striker 30 provided at the opening portion 12 of the airframe. Also, when the door 13 is charged with static electricity (P-Static: Precipitation Static) generated by friction with hail, rain, snow, and dust during a flight, an electricity-removing bonding path (grounding path) for static electricity can be similarly configured in the airframe structure by the seal retention portion 14 on the door 13 side, the conductive fiber 24, and the striker 30 provided at the opening portion 12 of the airframe.

<Second Feature>

A second feature of the present invention is that the striker 30 includes a plating layer 32 at least on a surface of the distal end portion 30c (i.e., a contact surface with the conductive fiber 24 that covers the surface of the gasket seal 20).

As described above, the base material of the striker 30 is normally aluminum alloy. Although corrosion of aluminum alloy may be prevented not only by electrolytic treatment, but also by chemical conversion treatment (surface treatment for chemically forming an oxide film on a surface of aluminum alloy; examples thereof include boehmite process, MBV (Modifizierte Bauer Vogel) process, phosphate process, and chromate process), the chemical conversion treatment (an oxide film) is not suitable since the chemical conversion treatment cannot ensure conductivity. Thus, in the present invention, the plating layer 32 is formed at least on the surface of the distal end portion 30c of the striker 30.

A nickel plating layer or a chrome plating layer is preferably used as the plating layer 32. Particularly, when the plating layer 32 is formed by hard chrome plating or electroless nickel plating, mechanical characteristics such as abrasion resistance and vibration resistance of the striker 30 can be also improved. Therefore, the hard chrome plating and the electroless nickel plating are preferably used for the plating layer 32 of the striker 30 that is abutted against the gasket seal 20 every time the door 13 is closed.

Since hardness of an electroless nickel film can be increased by heat treatment, abrasion resistance can be also improved. The electroless nickel film is also provided with representative characteristics of a plating film, and has excellent throwing power and chemical resistance, and high decorativeness. Color may be also changed by plating gold or chrome on the electroless nickel film.

The plating layer 32 may be also formed by tin plating, silver plating, and zinc plating. The aluminum alloy material may be also plated by the above materials, and tin plating, silver plating, and zinc plating films are also provided with the representative characteristics of the plating film.

The plating layer 32 may be formed so as to cover at least an entire region of a contact portion between the gasket seal 20 and the striker 30.

An insulating coating layer (an anticorrosion coating) 33 that prevents corrosion of the striker 30 itself may be further formed on a portion of the striker 30 other than the portion where the plating layer 32 is formed. The coating layer 33 is formed so as to cover end portions 32a and 32b of the plating layer 32, and the plating layer 32 and the coating layer 33 cover the entire striker 30. As shown in FIG. 1, the end portions 32a and 32b of the plating layer 32 are located on an opposite side from the distal end portion 30c of the striker 30 abutted against the gasket seal 20.

By providing the coating layer 33, corrosion (galvanic corrosion) in a boundary portion between the plating layer 32 and the base material of the striker 30, or another portion can be prevented. Accordingly, it is not necessary to use a CRES material as the base material of the striker 30 so as to prevent corrosion, and it is possible to use aluminum alloy, so that the striker 30 can be formed while an increase in weight is suppressed.

In the above configuration, the gasket seal 20 is provided on the back surface 13a of the door 13, and the surface of the gasket seal 20 is covered with the conductive fiber 24. When the door 13 is in a closed state, the gasket seal 20 covered with the conductive fiber 24 is abutted against the striker 30 that is provided on the skin 11 side of the airframe, and the base material and the plating layer 32 of which are made of a conductive material. Accordingly, while not only ensuring airtightness and water proof properties between the door 13 and the opening portion 12 of the airframe, electromagnetic waves can be also reliably shielded since the door 13 and the skin 11 of the airframe are electrically connected together via the conductive fiber 24, and the plating layer 32 and the base material of the striker 30.

Here, examples of a preferable combination between the plating layer 32 of the striker 30 and the conductive fiber 24 that covers the surface of the gasket seal 20 are described. When the following combinations are employed, corrosion of the conductive fiber 24 or the striker 30 due to galvanic corrosion between dissimilar metals can be prevented.

—Case 1: When the Plating Layer 32 of the Striker 30 is a Nickel Plating Layer.—

In the case 1, conductive fiber obtained by forming a metal plating film containing nickel, copper, silver, gold, or alloy thereof as a main component on a surface of synthetic fiber such as polyester fiber and polyurethane fiber is preferable as the conductive fiber 24.

—Case 2: When the Plating Layer 32 of the Striker 30 is a Chrome Plating Layer or a Tin Plating Layer.—

In the case 2, the conductive fiber 24 can be formed by metal fiber formed of 300 series stainless steel, 400 series stainless steel, or 2000 series aluminum alloy.

Although the configuration in which the gasket seal 20 itself is formed of non-conductive silicone rubber, EPDM rubber or the like, and the surface of the gasket seal 20 is covered with the conductive fiber 24 is described above, a body of the gasket seal 20 itself may have conductivity.

That is, the body of the gasket seal 20 itself may be formed of conductive EPDM rubber, conductive silicone rubber, conductive silicone elastomer or the like obtained by causing a rubber material such as EPDM rubber and silicone rubber to contain a metallic filler of Ag, Cu, Ni, Al and the like, or carbon particles. Instead of the above metallic filler, Ag/Cu, Ag/Al, Ni/Cu, Ni/Al, Ag/C, Ni/C and the like may be used.

Even when the body of the gasket seal 20 is formed of a conductive rubber material, the surface of the body of the gasket seal 20 is covered with the conductive fiber 24. Since the conductive rubber material and the conductive fiber 24 are used, the electro-magnetic shielding effect of the gasket seal 20 can be improved.

In the present specification, terms such as "Ag/Cu" have the following meanings.

Ag/Cu: a filler in which outer surfaces of copper particles are silver-plated.

Ag/Al: a filler in which outer surfaces of aluminum particles are silver-plated.

Ni/Cu: a filler in which outer surfaces of copper particles are nickel-plated.

Ni/Al: a filler in which outer surfaces of aluminum particles are nickel-plated.

Ag/C: a filler in which outer surfaces of graphite carbon particles are silver-plated.

Ni/C: a filler in which outer surfaces of graphite carbon particles are nickel-plated.

<Modification>

Although the gap between the door 13 and the opening portion 12 is closed by the gasket seal 20 and the striker 30 having a sectional shape as shown in FIG. 1 in the above embodiment, the present invention is not limited thereto.

Figure 2A:
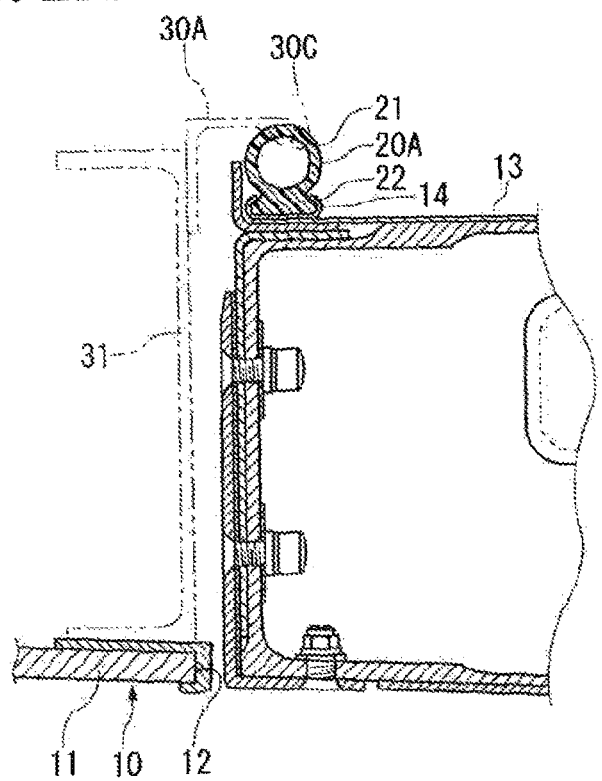
FIGS. 2A and 2B are sectional views illustrating modifications of the first embodiment.

For example, although the distal end portion 30c of the striker 30 is abutted against the distal end surface of the seal portion 21 of the gasket seal 20 in a perpendicular direction in FIG. 1, a distal end portion 30C of a striker 30A may be abutted against the distal end surface of the seal portion 21 of a gasket seal 20A in parallel therewith as shown in FIG. 2A.

Figure 2B:
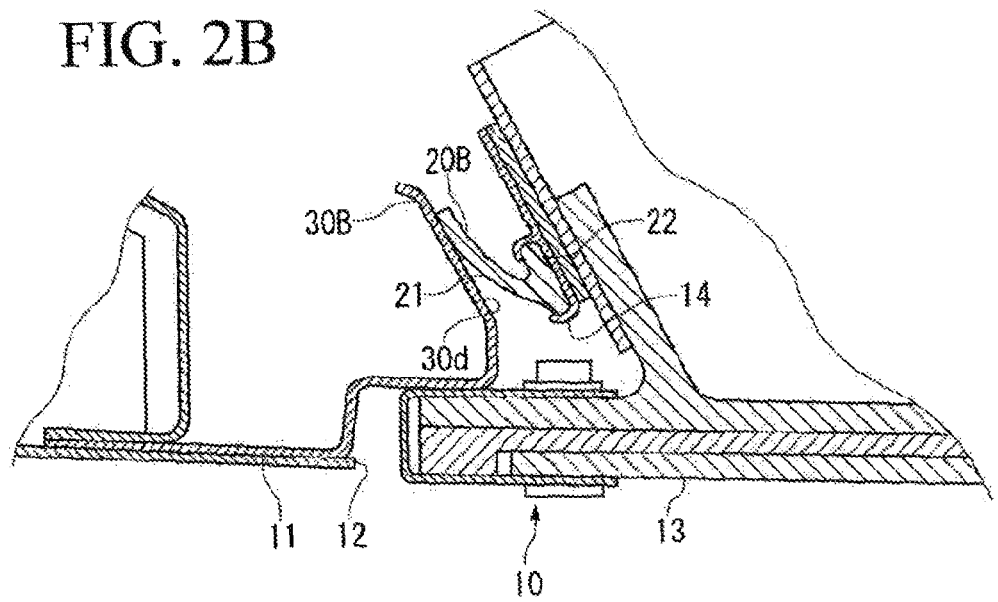

Moreover, as shown in FIG. 2B, the seal portion 21 of a gasket seal 20B may be formed in a flat-plate shape extending in a belt-like shape from the base portion 22. Furthermore, a flat portion 30d of a striker 30B may contact the seal portion 21.

Second Embodiment

A second embodiment shows an example in which a gasket seal 20C is abutted against a scuff plate 50 that is arranged around a door frame 100. Elements common to those in the aforementioned configuration are assigned the same reference numerals, and description thereof is omitted.

Figure 3:
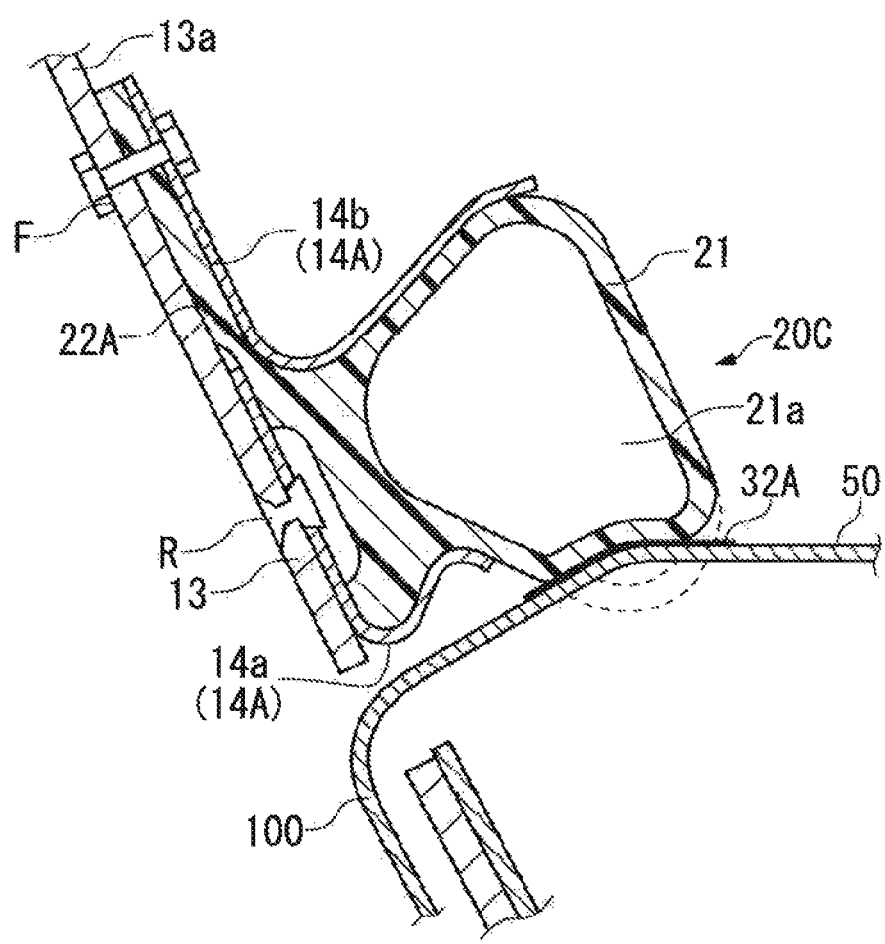
FIG. 3 is a sectional view illustrating a seal structure for an opening portion of an aircraft according to a second embodiment.

As show in FIG. 3, the gasket seal 20C comprises the seal portion 21 and a base portion 22A that is formed integrally with the seal portion 21 at one end thereof. The gasket seal 20C is fixed along the outer periphery of the door 13 with the entire base portion 22A and a portion of the seal portion 21 fitted to a seal retention portion 14A. The seal retention portion 14A includes an outer-side seal retention portion 14a that is arranged on an outer peripheral edge portion of the door 13, and an inner-side seal retention portion 14b that is arranged on an inner side of the door 13 relative to the outer-side seal retention portion 14a. The outer-side seal retention portion 14a is fixed by a fixing rivet R, and the inner-side seal retention portion 14b is fixed by a fixing fastener F to the door 13, respectively.

Although the surface of the gasket seal 20C is covered with the aforementioned conductive fiber 24, the conductive fiber 24 is omitted in FIG. 3. The scuff plate 50 is formed of a conductive material such as aluminum alloy.

When the door 13 is in a closed state, the gasket seal 20C is electrically connected to the scuff plate 50 that is arranged around the door frame 100 and is made of a conductive material. That is, the gasket seal 20C is electrically grounded to the door frame 100 via the scuff plate 50. In accordance with the configuration, the electro-magnetic shielding structure is achieved between the door 13 and the door frame 100.

A plating layer 32A may be formed on the scuff plate 50 in a similar manner to the first embodiment in which the plating layer 32 is formed on the striker 30. The plating layer 32A is preferably formed so as to cover at least a contact portion between the scuff plate 50 and the conductive fiber 24. A preferable combination between the plating layer 32A and the conductive fiber 24 is as described above. For example, when the conductive fiber 24 of the gasket seal 20C is synthetic fiber where a metal plating film is formed on a surface, the plating layer 32A is preferably formed on the scuff plate 50 such that an anodic index of a metal material constituting the plating layer 32A of the scuff plate 50 is equal to or almost equal to an anodic index of a metal material constituting the metal plating film of the conductive fiber 24. Also, when the conductive fiber 24 of the gasket seal 20C is metal fiber, the plating layer 32A is preferably formed on the scuff plate 50 such that an anodic index of a metal material constituting the metal fiber is equal to or almost equal to the anodic index of the metal material constituting the plating layer 32A of the scuff plate 50.

Third Embodiment

A third embodiment shows an example in which a gasket seal 20D is provided on the door 13 side via a door-side bonding strap (a first bonding strap) 60A.

Figure 4A:
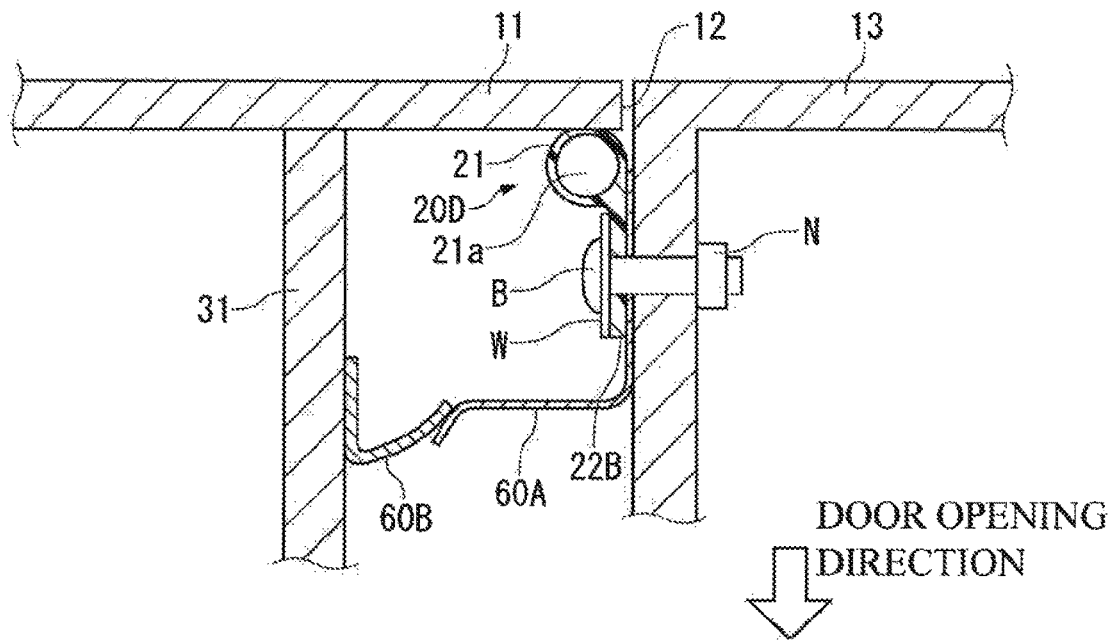
FIG. 4A is a sectional view illustrating a seal structure for an opening portion of an aircraft according to a third embodiment.
Figure 4B:
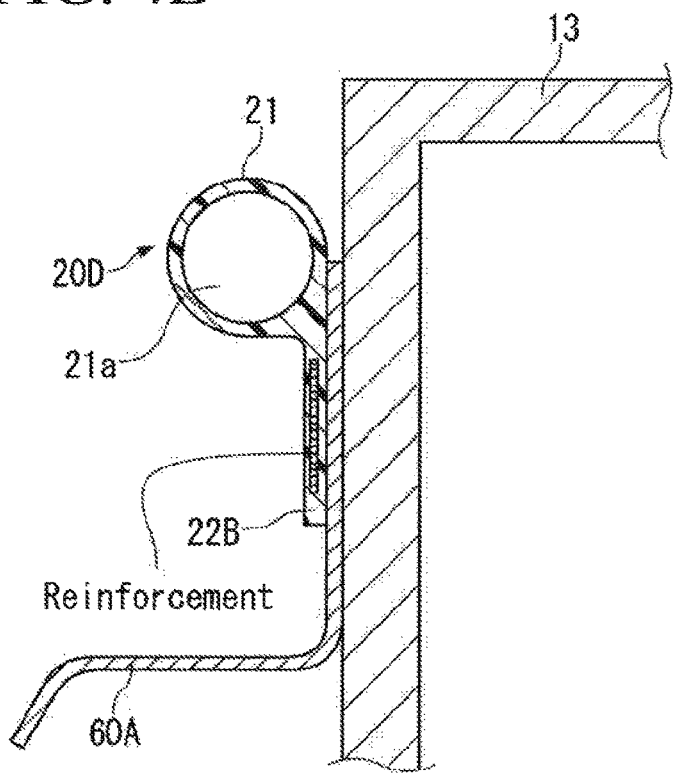
FIG. 4B is an enlarged view of a gasket seal according to the third embodiment.

As shown in FIGS. 4A and 4B, the gasket seal 20D comprises the seal portion 21, and a base portion 22B that is formed integrally with the seal portion 21 at one end thereof. The gasket seal 20D has a P shape in sectional view, and the surface thereof is covered with the aforementioned conductive fiber 24. The conductive fiber 24 is omitted in FIGS. 4A and 4B.

The door-side bonding strap 60A has a substantially L shape in sectional view. The gasket seal 20D is fixed to the door 13 via a bolt B and a nut N while the base portion 22B of the gasket seal 20D is held between a washer W and the door-side bonding strap 60A.

The bolt B penetrates the base portion 22B of the gasket seal 20D. Therefore, the base portion 22B is reinforced so as to have higher rigidity than the seal portion 21A by inserting a core formed of glass fiber or the like into the base portion 22B.

One end of the door-side bonding strap 60A is abutted against one end of an airframe opening portion-side bonding strap (a second bonding strap) 60B when the door 13 is closed. One end of the airframe opening portion-side bonding strap 60B is fixed to the edge member (the door frame) 31 provided at the airframe opening portion with a fixture such as a bolt and a nut. The door-side bonding strap 60A and the airframe opening portion-side bonding strap 60B are metallic fittings fabricated from corrosion resistant steel (CRES) or the like.

In the third embodiment, the gasket seal 20D whose surface is covered with the conductive fiber 24 is also arranged between the door 13 and the opening portion 12 of the airframe 11. Accordingly, electro-magnetic waves from outside of the airframe can be prevented from entering the airframe through the gasket seal 20D. The gasket seal 20D is also electrically grounded to the door 13 via the door-side bonding strap 60A that supports the gasket seal 20D. When the door 13 is closed, the door-side bonding strap 60A is abutted against the airframe opening portion-side bonding strap 60B. In accordance with the configuration, the electro-magnetic shielding structure is achieved between the door 13 and the opening portion 12 of the airframe 11.

For charging with lightning return current when the door 13 is struck by lightning, and static electricity (P-static) during a flight, electricity can be reliably passed to the airframe structure from the bonding straps 60A and 60B so as to remove static electricity.

Also, galvanic corrosion due to joining of dissimilar metals under moisture and salt spray environments is designed so as not to occur among the gasket seal 20D, the door-side bonding strap 60A, and the airframe opening portion-side bonding strap 60B.

For example, conductive fiber obtained by forming a metal plating film containing nickel (with an anodic index of 0.30), copper (with an anodic index of 0.35), or nickel copper alloy (with an anodic index of 0.30) as a main component on a surface of synthetic fiber such as polyester fiber and polyurethane fiber is used as the conductive fiber 24 that covers the surface of the gasket seal 20D. The bonding straps 60A and 60B are formed of the same type of corrosion resistant steel (CRES; with an anodic index of 0.35), and a plating layer containing nickel (with an anodic index of 0.30) or nickel chrome alloy (with an anodic index of 0.35) as a main component is formed on a contact portion of the bonding strap 60A with the conductive fiber 24. As described above, the bonding straps 60A and 60B are formed of the same type of corrosion resistant steel, and such materials are selected that an anodic index of a metal material constituting the metal plating film of the conductive fiber 24 is equal to or almost equal to an anodic index of a metal material constituting the plating layer of the bonding strap 60A, so that the occurrence of galvanic corrosion can be prevented.

Example 1

Figure 5:
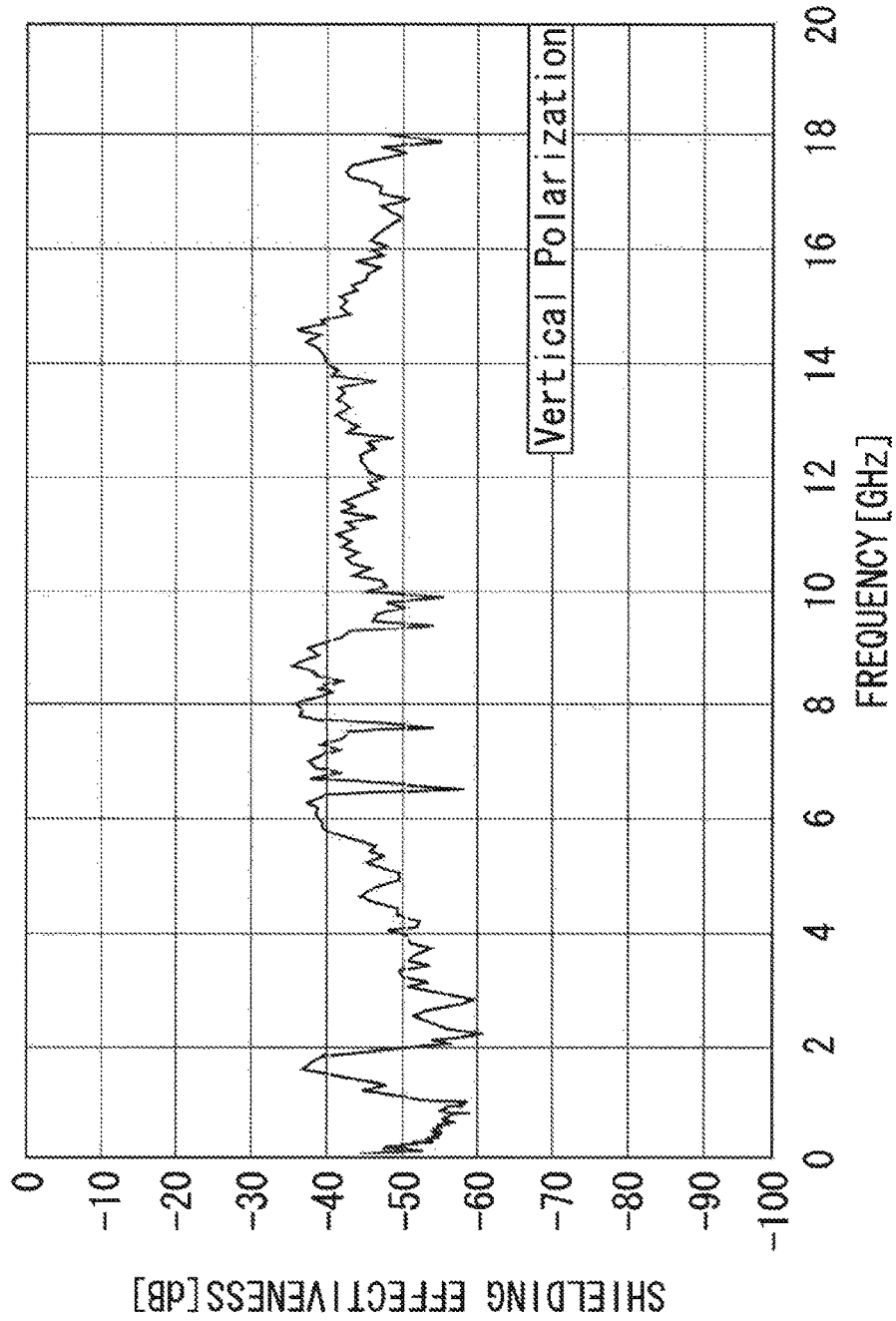
FIG. 5 is a graph illustrating an electro-magnetic shielding measurement result (vertical polarization) when the gasket seal according to the third embodiment is used.
Figure 6:
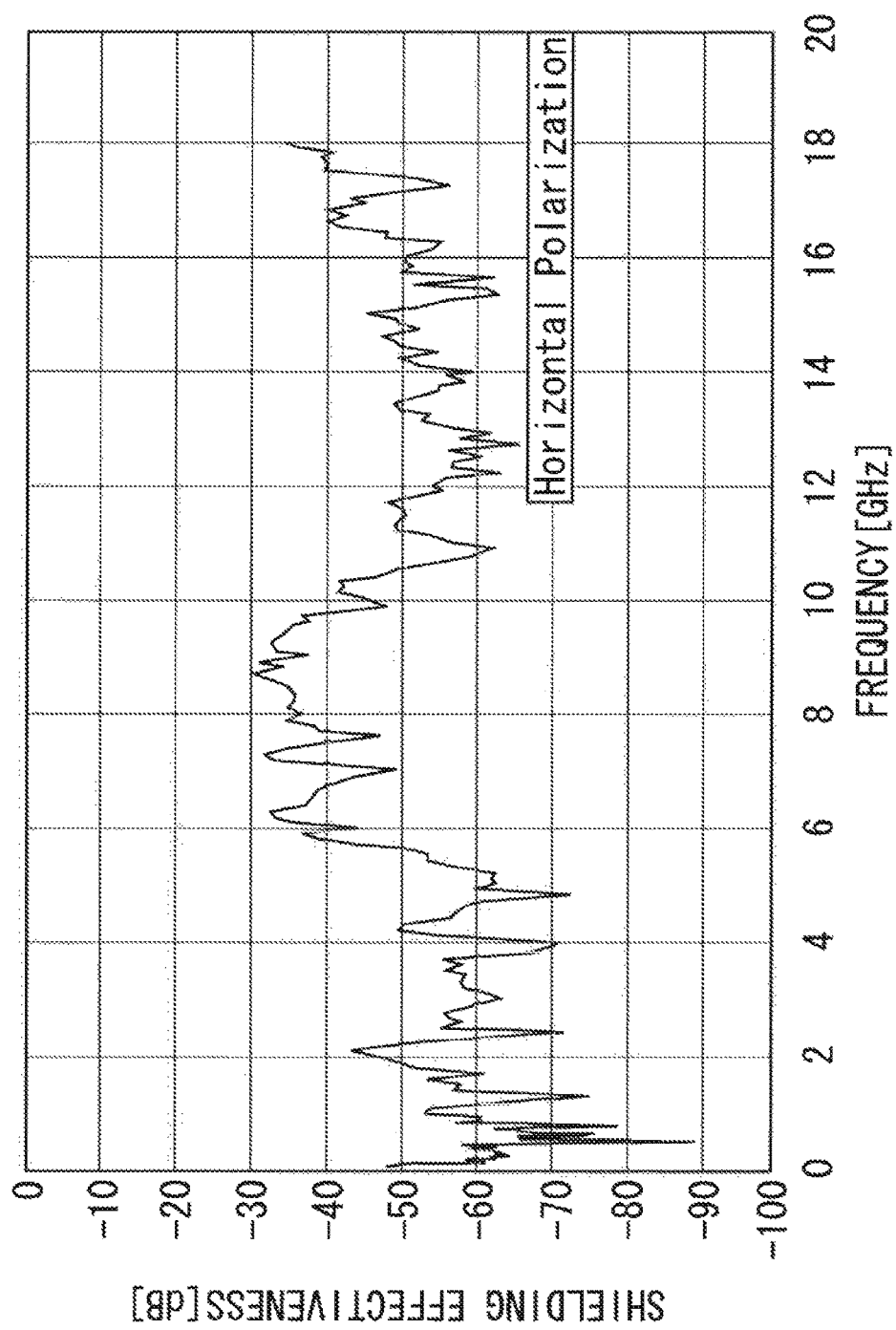
FIG. 6 is a graph illustrating an electro-magnetic shielding measurement result (horizontal polarization) when the gasket seal according to the third embodiment is used.
Figure 7:
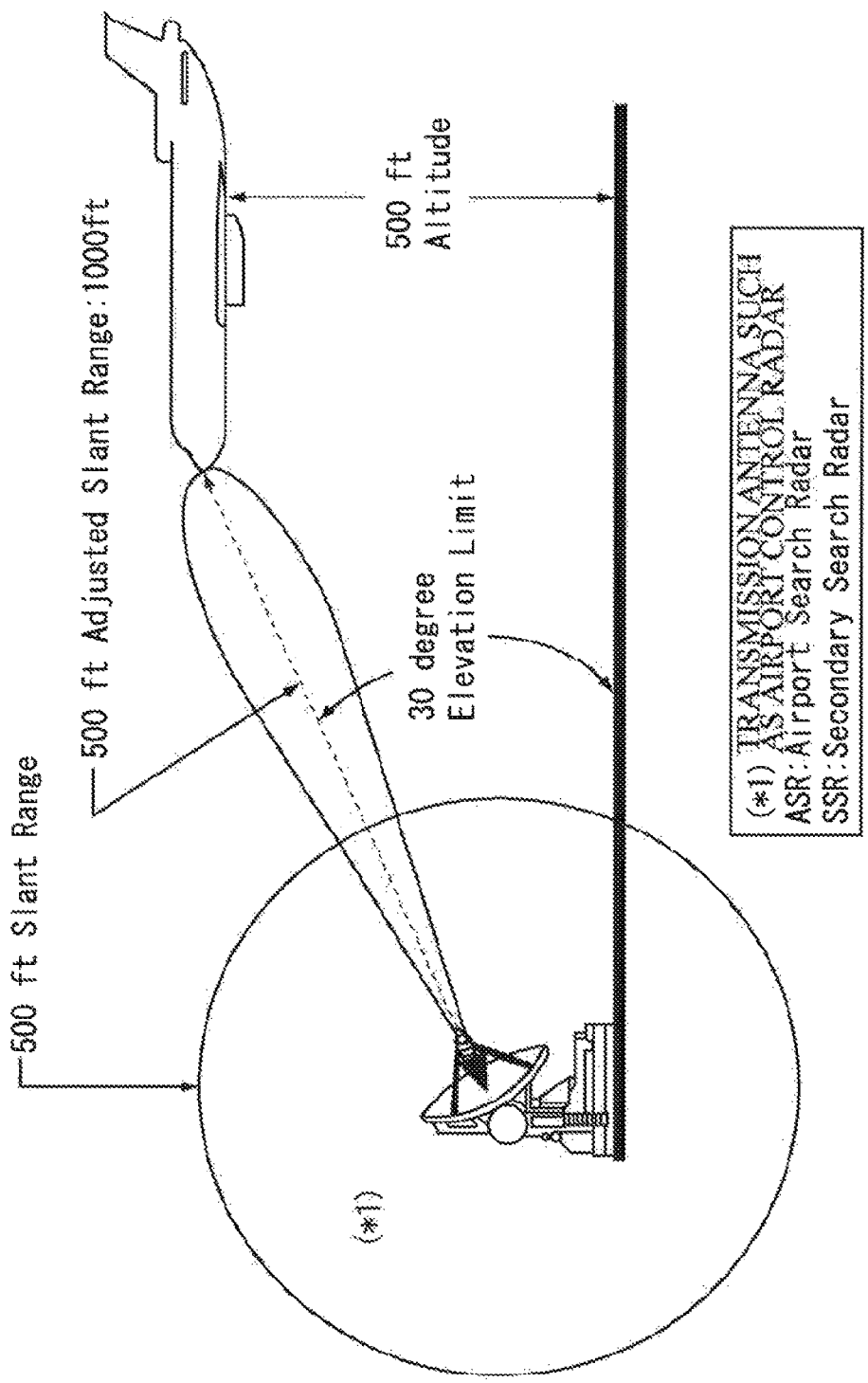
FIG. 7 is a view illustrating an HIRF (High Intensity Radiated Fields) environment that an aircraft encounters.

An electro-magnetic shielding test was performed by using the gasket seal 20D described in the third embodiment based on IEEE STD-299-2006 "IEEE Standard Method for Measuring the Effectiveness of Electromagnetic Shielding Enclosures". An electro-magnetic shielding effect obtained when the number of the bonding straps 60 for electrically connecting the gasket seal 20D was set to 10 is shown in FIGS. 5 and 6. The body of the gasket seal 20D was made of silicone rubber, and did not include a conductive filler therein. Nickel-plated polyester fiber was used as the conductive fiber 24 covering the surface of the gasket seal 20D. The conductive fiber 24 was attached to the surface of the gasket seal 20D by conductive silicone rubber.

As shown in FIGS. 5 and 6, the electro-magnetic shielding effect within a frequency band of 100 MHz to 18 GHz was 30 dB or more by using the gasket seal 20D whose surface was covered with the conductive fiber 24.

Figure 8:
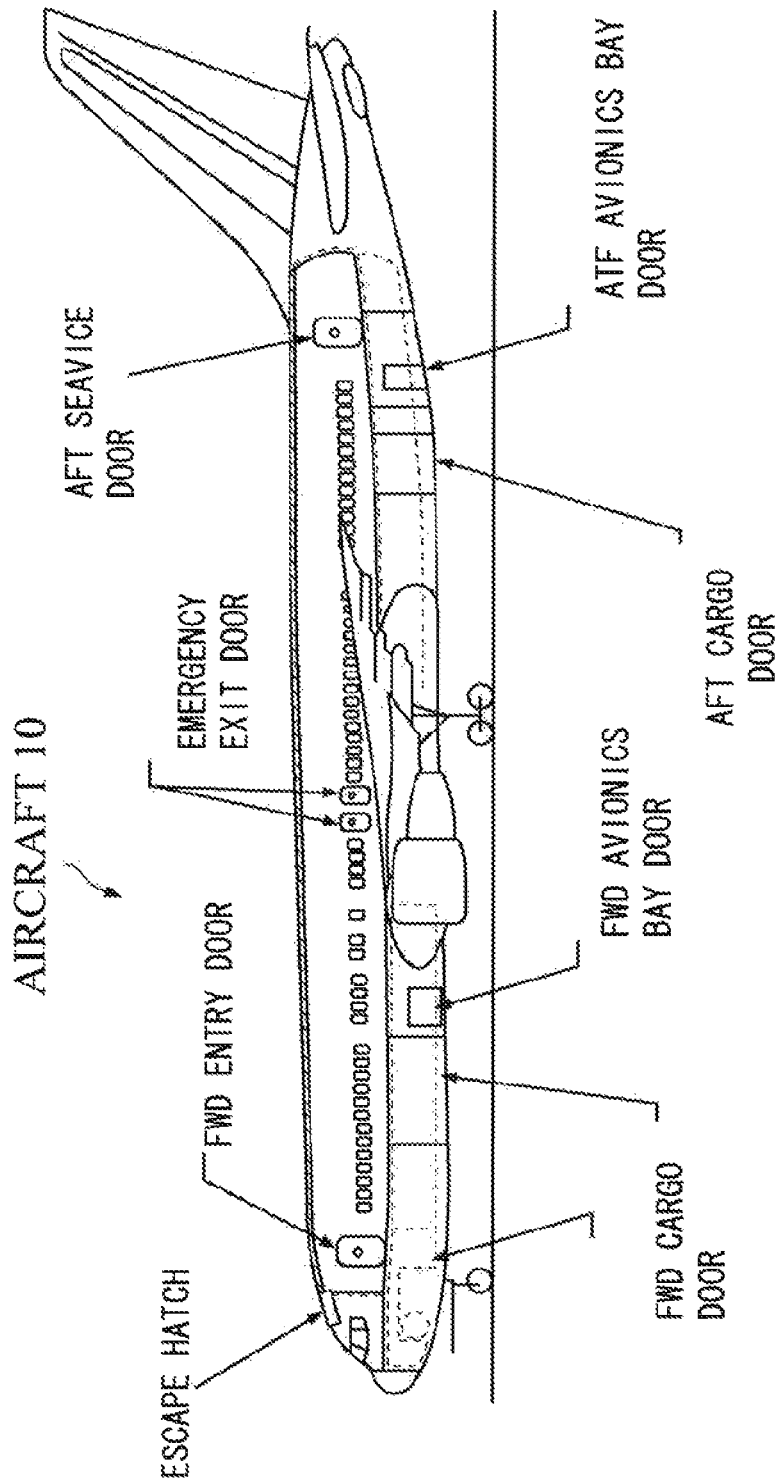
FIG. 8 is a view illustrating doors and hatches of an aircraft.

Although the example in which the gasket seal 20 (20A to 20D) is applied to the door 13 or the opening portion 12 of the airframe of the aircraft 10 is described in the above embodiments, the application of the gasket seal 20 is not limited to the door 13, but it can be of course applied to an escape hatch or the like shown in FIG. 8. This is because the escape hatch is also attached to the opening portion 12 formed in the skin 11 constituting the airframe of the aircraft 10, and it is necessary to arrange an airtight gasket seal between the opening portion 12 and the escape hatch. Examples of the door 13 include an openable entry door, a service door, a cargo door, and an avionics bay door of the aircraft 10 as shown in FIG. 8.

The present invention may also relate to an aircraft having the electro-magnetic shielding structure as described above. The present invention may be also applied to a case in which a gasket seal at an opening portion such as a maintenance/inspection panel, and a manhole of the aircraft is made conductive. The manhole is a cavity provided so as to allow inspection and maintenance of an inner portion of a wing as a fuel tank.

Moreover, the gasket seal of the present invention may be applied as a pressure seal for a vent door provided in the entry door or the like.

Although the example in which the gasket seal 20 (20A to 20D) is applied to one of the opening portion 12 formed in the skin 11 and the door 13 is described, the gasket seal may be provided on both the opening portion 12 and the door 13 depending on the shape of the gasket seal.

The constitutions described in the embodiments described above may be also freely selected or appropriately changed into other constitutions without departing from the scope of the present invention.

REFERENCE SIGNS LIST

10 Aircraft
11 Skin
12 Opening portion
13 Door (Closing body)
14, 14A Seal retention portion
20, 20A, 20B, 20C, 20D Gasket seal
21 Seal portion
22 Base portion
24 Conductive fiber
30, 30A Striker (Metallic fitting)
31 Edge member (Door frame)
32, 32A Plating layer
33 Coating layer (Anticorrosion coating)
50 Scuff plate (Metallic fitting)
60A Door-side bonding strap (Metallic fitting, First bonding strap)
60B Airframe opening portion-side bonding strap (Metallic fitting, Second bonding strap)
100 Door frame

The invention claimed is:

1. A seal structure for an opening portion of an aircraft comprising a gasket, the gasket seal being arranged between the opening portion formed in an airframe of the aircraft and a closing body for closing the opening portion, wherein
the gasket seal comprises:
a gasket seal body that is made of a rubber material; and
conductive fiber that covers a surface of the gasket seal body, and
wherein the closing body is a door,
a first bonding strap made of corrosion resistant steel is provided on the door while supporting the gasket seal,
a second bonding strap made of corrosion resistant steel is provided on a door frame formed at the opening portion, and
the first bonding strap is abutted against the second bonding strap when the door is closed.

2. The seal structure according to claim 1, wherein the conductive fiber is one of a) synthetic fiber where a metal plating film is formed on a surface, b) metal fiber, and c) polymer fiber including a conductive material.

3. The seal structure according to claim 1, wherein the rubber material is silicone rubber.

4. The seal structure according to claim 1, wherein the rubber material is conductive rubber into which a conductive filler is mixed.

5. The seal structure according to claim 1,
wherein the conductive fiber of the gasket seal is a synthetic fiber where a metal plating film is formed on a surface, and
an anodic index of a metal material constituting the metal plating film is equal to or almost equal to an anodic index of a metal material constituting the plating layer of the metallic fitting.

6. The seal structure according to claim 5, wherein the plating layer of the metallic fitting is a plating layer containing nickel or chrome as a main component.

7. The seal structure according to claim 5, wherein the plating layer of the metallic fitting is an electroless nickel plating layer or a hard chrome plating layer.

8. The seal structure according to claim 5, wherein the plating layer of the metallic fitting is a plating layer containing tin as a main component.

9. The seal structure according to claim 5,
wherein the plating layer of the metallic fitting is a nickel plating layer, and
the conductive fiber of the gasket seal is obtained by forming a metal plating film containing nickel, copper, silver, gold, or alloy thereof as a main component on a surface of synthetic fiber.

10. The seal structure according to claim 5,
wherein the plating layer of the metallic fitting is a chrome plating layer or a tin plating layer, and
the conductive fiber of the gasket seal is made of metal fiber formed of 300 series stainless steel, 400 series stainless steel, or 2000 series aluminum alloy.

11. The seal structure according to claim 1,
wherein the conductive fiber of the gasket seal is a metal fiber, and
an anodic index of a metal material constituting the metal fiber is equal to or almost equal to an anodic index of a metal material constituting the plating layer of the metallic fitting.

* * * * *

UNITED STATES PATENT AND TRADEMARK OFFICE
CERTIFICATE OF CORRECTION

| | | |
|---|---|---|
| PATENT NO. | : 9,777,838 B2 | Page 1 of 1 |
| APPLICATION NO. | : 15/444587 | |
| DATED | : October 3, 2017 | |
| INVENTOR(S) | : Yusaku Yahata et al. | |

It is certified that error appears in the above-identified patent and that said Letters Patent is hereby corrected as shown below:

In the Specification

Column 3, Line 62, "(CRSS)" should read -- (CRES) --.

Column 6, Line 16, "(CRSS)" should read -- (CRES) --.

Signed and Sealed this
Tenth Day of July, 2018

Andrei Iancu
*Director of the United States Patent and Trademark Office*